United States Patent [19]

Cacciatore

[11] Patent Number: 4,948,044
[45] Date of Patent: Aug. 14, 1990

[54] ELECTRONIC DIGITAL THERMOSTAT HAVING AN IMPROVED POWER SUPPLY

[75] Inventor: Joseph J. Cacciatore, Westmont, Ill.

[73] Assignee: Harper-Wyman Company, Lisle, Ill.

[21] Appl. No.: 396,522

[22] Filed: Aug. 21, 1989

[51] Int. Cl.⁵ .................................................. F23N 5/20
[52] U.S. Cl. ..................................... 236/46 R; 165/12
[58] Field of Search ........................ 236/46 R; 165/12

[56] References Cited

U.S. PATENT DOCUMENTS

| | | | |
|---|---|---|---|
| 3,360,197 | 12/1967 | Stringham | 236/68 |
| 3,372,328 | 3/1968 | Pinckaers | 323/22 |
| 3,993,120 | 11/1976 | Iberg et al. | 165/26 |
| 4,054,245 | 10/1977 | Bennetsen et al. | 236/47 |
| 4,162,036 | 7/1979 | Balduzzi et al. | 236/47 |
| 4,177,923 | 12/1979 | Krump | 236/46 R |
| 4,215,815 | 8/1980 | Krump | 236/46 R |
| 4,235,368 | 11/1980 | Neel | 236/46 R |
| 4,249,696 | 2/1981 | Donnelly et al. | 236/46 R |
| 4,301,438 | 11/1981 | McElroy | 337/339 |
| 4,308,991 | 1/1982 | Peinetti et al. | 236/46 R |
| 4,333,605 | 6/1982 | Peters | 236/78 R |
| 4,431,134 | 2/1984 | Hendricks et al. | 236/46 R |
| 4,621,336 | 11/1986 | Brown | 364/557 |
| 4,632,303 | 12/1986 | Rodittis | 236/46 R |

Primary Examiner—William E. Wayner
Attorney, Agent, or Firm—Mason, Kolehmainen, Rathburn & Wyss

[57] ABSTRACT

An improved power supply circuit is provided for use with programmable electronic digital thermostats of the type including a controlled semiconductor switch connected in series with an external alternating current (AC) voltage source. The power supply circuit includes a first rectifier bridge coupled across the controlled semiconductor switch for rectifying the external AC voltage to produce a first direct current voltage. A transformer has a primary winding and a secondary winding. The primary winding is connected in series with the controlled semiconductor switch and the external AC voltage source. A second rectifier bridge is connected across the secondary winding for rectifying the alternating current to produce a second direct current voltage. A voltage regulator has an input coupled to the first and second rectifier bridges and an output for providing a predetermined supply voltage for the programmable electronic digital thermostat.

6 Claims, 2 Drawing Sheets

ELECTRONIC DIGITAL THERMOSTAT HAVING AN IMPROVED POWER SUPPLY

BACKGROUND OF THE INVENTION

1. Field of the Invention

The present invention relates generally to programmable electronic digital thermostats for use with heating and cooling systems, and more particularly to an improved power supply circuit for programmmable electronic digital thermostats.

2. Description of the Prior Art

Known electronic digital thermostats provide substantial energy savings by controlling conventional temperature conditioning systems in accordance with selected temperatures for a sequence of time intervals. Examples of electronic digital thermostats are disclosed in U.S. Pat. Nos. 4,298,946, 4,388,592 and 4,442,972 which are assigned to the present assignee.

Advantageously operating power for electronic digital thermostats is derived from an external low voltage 24 volt AC (alternating current) power source from a conventional voltage step-down transformer of the furnace electrical system. Utilizing existing wiring for an electromechanical thermostat, such as a standard 4-wire connection scheme facilitates installation of programmable electronic digital thermostats. Also it is preferred that a backup battery is used to provide operating power in the event of a power interruption in the external low voltage 24-volt AC power source. Disadvantages of various known power supply arrangements used with programmable electronic digital thermostats are that they are generally complex and are costly in manufacture.

An improved power supply for electronic digital thermostats including the above advantages is taught by U.S. Pat. No. 4,799,176, issued Jan. 17, 1989 to the present inventor Joseph J. Cacciatore, and assigned to the present assignee. The power supply includes a bridge rectifier connected between the external AC power source and a controlled semiconductor switch for selectively activating or deactivating an external relay for controlling the operation of the temperature conditioning system. A voltage regultor is coupled at its input to the bridge rectifier for providing a predetermined operating voltage to the programmable thermostat. A capacitor is connected to the voltage regulator input for charging to a predetermined voltage potential. Control circuitry is connected between the capacitor and the controlled semiconductor switch for sensing the voltage potential of the capacitor and for deactivating the semiconductor switch in response to a sensed voltage potential below a second predetermined voltage potential to enable the capacitor to recharge to the first predetermined voltage potential without deactivating the external relay. While this disclosed power supply provides improvements over prior art power supply arrangements, it is desirable to provide a further improved power supply capable of reliably and effectively providing operating power for an electronic digital thermostat while eliminating the need for such control circuitry, and that is simple and inexpensive to make and that is not unnecessarily large in size.

SUMMARY OF THE INVENTION

Among the important objects of the present invention are to provide an improved power supply circuit for programmable electronic digital thermostats; to provide a power supply circuit making possible a simplified, less expensive and a small sized configuration; and to provide a power supply circuit that overcomes many of the disadvantages of prior art power supply circuits for programmable electronic digital thermostats.

In brief, the objects and advantages of the present invention are achieved by a power supply circuit for providing operting power for a programmable electronic digital thermostat including a controlled semiconductor switch connected in series with an external alternating current (AC) voltage source. The power supply circuit includes a first rectifier bridge coupled across the controlled semiconductor switch for rectifying the external AC voltage to produce a first direct current voltage. A transformer has a primary winding and a secondary winding. The primary winding is connected in series with the controlled semiconductor switch and the external AC voltage source. A second rectifier bridge is connected across the secondary winding for rectifying the alternating current to produce a second direct current voltage. A voltage regulator has an input coupled to the first and second rectifier bridges and an output for providing a predetermined supply voltage for the programmable electronic digital thermostat.

BRIEF DESCRIPTION OF THE DRAWINGS

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
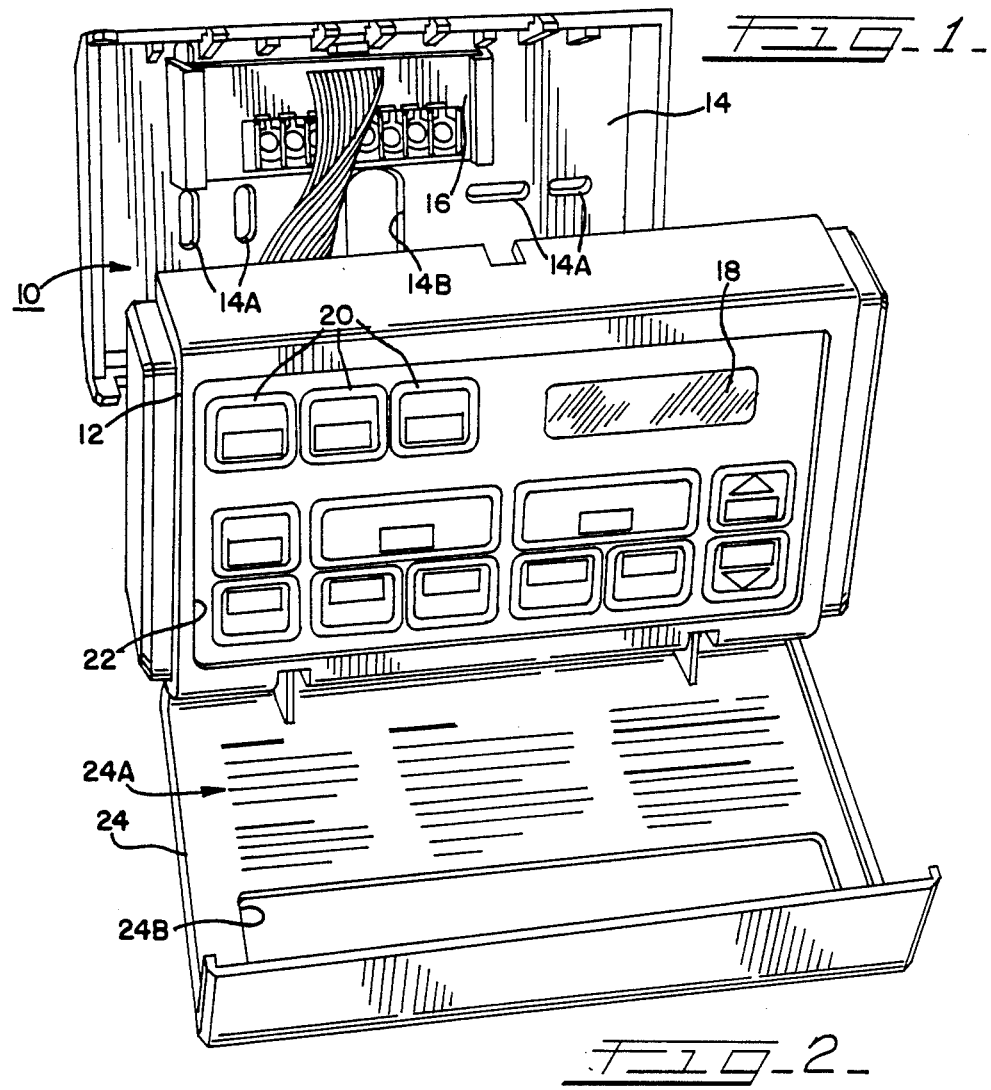
FIG. 1 is an exploded perspective view of a first embodiment of a programmable electronic digital thermostat in accordance with the present invention.

Referring now to the drawings, in FIG. 1 there is illustrated a preferred embodiment of a programmable electronic digital thermostat generally designated by the reference character 10. Electronic digital thermostat 10 has a generally rectangular housing 12 having a base or wall plate 14 configured with multiple openings 14A for receiving fasteners (not shown) for mounting the thermostat 10 on a wall. An opening 14B in the base plate 14 receives interconnecting wires from a conventional temperature conditioning system for termination to an output terminal block 16 carried by the base plate 14. A front wall of the housing 12 includes a liquid crystal display (LCD) 18 for displaying time, temperture, day of week and system indicators, a first group of key switches 20 disposed beside the LCD 18 for entering program override commands and a second key switches 22 for entering time and temperature schedule data and for entering selected modes of operation. A hinged door 24 carrying printed programming instructions 24A on its inside face for assisting the user in entering time and temperature schedule data is shown in an open position. During normal operation the door 24 covers the second keyboard 22 with the LCD display 18 and the first key switches 20 aligned with an aperture 24B within the door 24.

Figure 2:
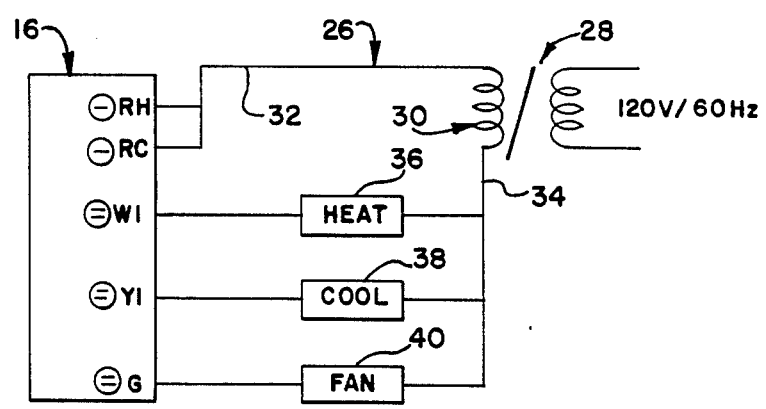
FIG. 2 is a circuit diagram showing the connection of the thermostat to an AC power source.

FIG. 2 illustrates the interconnection of the thermostat 10 via the output terminal block 16 with the conventional termperature conditioning system designated by the reference character 26. As shown, the temperature conditioning system 26 includes a single conventional voltage step-down transformer 28 providing a low voltage 24-volt AC power source at its secondary 30. A common side at a line 32 of the low voltage transformer secondary 30 is connected to the output terminal block 16 at a pair of terminals labelled RH and RC. An opposite side at a line 34 of the low voltage transformer secondary 30 is connected to the output terminal block 16 at each of a plurality of terminals labelled W1, Y1 and G via a heat relay 36, a cool relay 38 and a fan relay 40, respectively.

Figure 3:
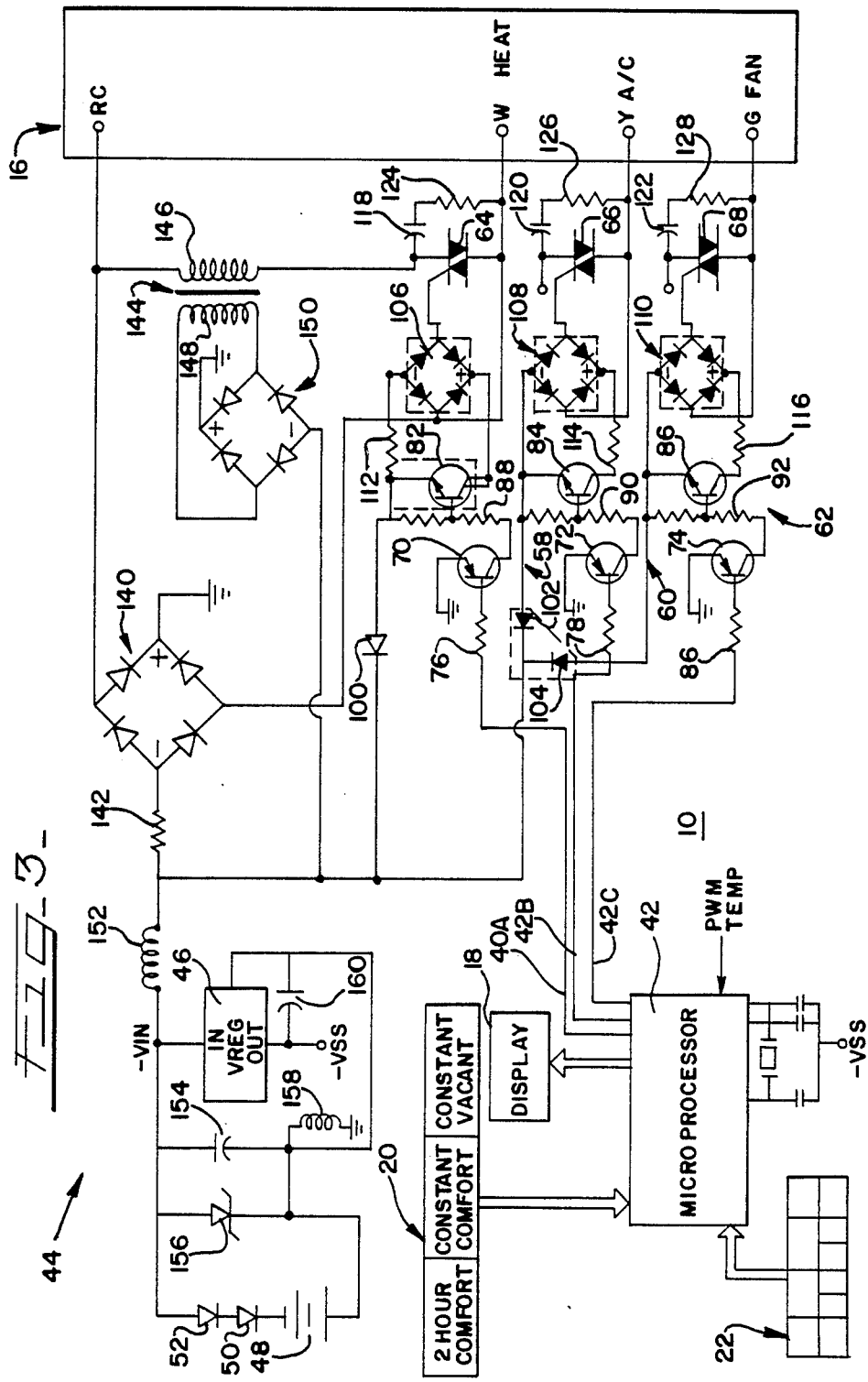
FIG. 3 is an electrical schematic and block diagram representation of the programmable electronic digital thermostat of FIG. 1.

Referring now to FIG. 3, there is shown an electrical schematic and block diagram representation of the programmable electronic digital thermostat 10. As its major functional components, the programmable electronic digital thermostat 10 includes a microprocessor 42 opertively associated with the display 18 and the key switches 20 and 22 for performing logical control operations in accordance with a stored program and responsive to real time and actual ambient temperature data. Microprocessor 42 generates control signals at predetermined output ports illustrated by a plurality of lines labelled 42A, 42B, 42C for selectively activating and deactivating the heat relay 36, the cool relay 38 and the fan relay 40. U.S. Pat. No. 4,799,176 issued Jan. 17, 1989 referred to above, describes a microprocessor arrangement with a crystal oscillator circuit providing a timing source, a control program and a temperature detecting circuit that advantageously is used for the programmable electronic digital thermostat 10. The disclosure of this patent is incorporated herein by reference.

In FIG. 3, there is shown a power supply circuit of the programmable electronic digital thermostat 10 arranged in accordance with principles of the present invention and generally designated by the reference character 44. Power supply circuit 44 inlcudes a fixed voltage regulator device 46, such as an integrated circuit device type MC79L05ACD for providing at its output a fixed regulated DE negative supply voltage −VSS. The voltage regulator device 46 is arranged to continuously provide regulated output voltage −VSS, such as negative 5 volts ±5%, as a suitable low current supply voltage for the thermostat 10. As described in detail below, primary operating power is supplied to an input −VIN of the voltage regulator device 46 normally derived from the low voltage transformer secondary 30 of the temperature conditioning system 26.

A battery 48 having its positive terminal coupled to ground provides back-up operating power to the voltage regulator 46 via a pair of blocking diodes 50 and 52. Back-up operating power is supplied by the battery 48 only when the 28 volt AC supply at terminal RC is interrupted and the voltage potential at the input −VIN drops below the battery voltage potential plus the voltage drop across the blocking diodes 50 and 52. For example, a 9-volt transistor battery can be used for the battery 48 so that when the input voltage potential at the input −VIN drops to approximately −7.6 volts, diodes 50 and 52 are forward biased. Then battery operating power is supplied to the input −VIN of the voltage regulator 46 without interruption of the regulated output voltage −VSS.

Output control functions of the thermostat 10 are provided by low power triac control circuitry advantageously arranged in conjunction with the power supply circuit 44. Control signals indicated at lines 42A, 42B, 42C generated the microprocessor 42 for selectively activating and deactivating the heat relay 36, the cool relay 38 and the fan relay 40, are respectively applied to a triac gating circuit 58, 60, 62 for controlling a controlled semiconductor switch or triac 64, 66, 68. Microprocessor control signals are applied to the base of a PNP switching transistor 70, 72, 74 via a resistor 76, 78, 80, respectively. Each of the transistors 70, 72, 74 is respectively arranged with the emitter connected to ground potential and the collector connected to the base of an NPN switching transistor 82, 84, 86 via a biasing resistor 88, 90, 92. A second biasing resistor 94, 96, 98 is respectively connected to the base of transistor 82, 84, 86 and to a blocking diode 100, 102, 104 connected to the input −VIN of the voltage regulator device 46. The emitter of transistors 82, 84, 86 is connected to the input −VIN of the voltage regulator device 46 via the blocking diode 100, 102, 104, respectively.

A voltage rectifier bridge 106, 108, 110 is connected across transistors 82, 84, 86, respectively. The emitter of transistor 82 is connected to the bridge + center terminal with its emitter coupled to the bridge − center terminal via a biasing resistor 112. The collector of transistors 82, 84, 86 is connected to the bridge + center terminal via a respective biasing resitor 114, 116 with its emitter coupled to the bridge −center terminal. Each output terminal W, Y and G connected to the heat relay 36, the cool relay 38 and the fan relay 40 is connected to a respective first center input terminal of the bridge rectifier 106, 108, 110 with its second center input terminal connected to the gate of triac 64, 66 and 68, as shown. A snubber network including a respective series combination of a capacitor 118, 120, 122 and a resistor 124, 126, 128 is connected across triac 64, 66 and 68 to prevent misfiring of the triac.

Operating power to the power supply circuit 44 is derived from the external low voltage transformer during idle control operation by rectified voltage supplied by a first diode bridge rectifier 140 connected between the common 28 volt AC source terminal RC and the controlled output terminal W for the heat relay. The negative output of diode bridge rectifier 140 is coupled to the input −VIN of the voltage regulator 46 via the bridge negative center terminal connected to a current limiting resistor 142 with its positive center terminal connected to ground.

A step-up transformer 144 of the power supply circuit 44 provides an AC supply voltage during energized or activated control of the triac 64. The step-up transformer 144 has a primary winding 146 connected to the output terminal RC and connected in series with the MT1 input of triac 64 with the MT2 input of triac 64 connected to the output terminal W. The MT1 input of triac 66, 68 is connected to the output terminal RC with the MT2input of triac 66, 68 connected to the respective output terminals Y and G. A secondary winding 148 of the step-up transformer 144 is connected across the center terminals of a diode bridge rectifier 150. An inductor 152 couples the rectified negative voltage output of the diode bridge rectifiers 140 and 150 to the input −VIN of the voltage regulator device 46. A parallel combination of a capacitor 154 and a Zener diode 156 connected in series with a second inductor 158 is connected between the input −VIN of the voltage regulator device 46 and ground. The positive terminal of battery 48 is coupled to ground via the second inductor 158. A filtering capacitor 160 is connected between the output −VSS of the voltage regulator device 46 and the junction of capacitor 154 and diode 156 with the inductor 158.

An inductance value of approximately 57 μH (microhenry) can be used for the inductors 152 and 158 with a cpacitance value of approximately 47 μF (microfarad) for the capacitor 154 providing effective high frequency noise immunity for the thermostat 10 from the temperature conditioning system 26. A capacitance value of approximately 47 μF can be used for the filtering capacitor 160.

A step-up ratio of approximately 16:1 between the secondary and primary windings can be used for the transformer 144. The primary winding 146 has a low impedance value resulting in a voltage drop of approximately 0.5 volts across the primary winding 146 so that the voltage drop over the relay 36 is sufficient to energize the relay 36. A small sized configuration for the transformer 144 facilitates desired overall dimensions for the thermostat 10, for example, such as, overall thermostat dimensions in inches of 6×4×2.

In operation, when the triac 64 is deactivated, a low level current flow through the first diode bridge rectifier 140 and the current limiting resistor 142 of the power supply circuit 44 provides DC voltage to the input −VIN of the voltage regulator device 46. This low level current flow is insufficient to activate the heat relay 36. When the triac 64 is energized to activate the heat relay 36, the current flow through the primary winding 146 of the step-up transformer 144 produces a secondary voltage applied to the diode bridge 150 to provide sufficient DC voltage to the input −VIN of the voltage regulator device 46 to maintain the suitable low current supply voltage −VSS for the thermostat 10.

While the invention has been described with reference to details of the illustrated embodiment, these details are not intended to limit the scope of the invention as defined int he appended claims.

I claim:

1. A power supply circuit for providing operating power for a programmable electronic digital thermostat including a controlled semiconductor switch connected in series with an external alternating current (AC) voltage source comprising:

first rectifier means coupled across said controlled semiconductor switch for rectifying said external AC voltage to produce a first direct current voltage;

a transformer having a primary winding and a secondary winding, said primary winding connected in series with said controlled semiconductor switch and said external AC voltage source;

second rectifier means connected across said secondary winding for rectifying the alternating current to produce a second direct current voltage;

regulator means for providing a predetermined supply voltage for the programmable electronic digital thermostat; said regulator means having input means coupled to said first and second rectifier means; said first and second direct current voltages being applied to said regulator input means; and said regulator means having output means for providing said predetermined supply voltage;

first inductance means connected in series and connected to said regulator input means for filtering said first and second direct current voltages; and capacitance means and second inductance means coupled in series between said regulator input means and ground potential for filtering said first and second direct current voltages.

2. A power supply circuit as recited in claim 1 further comprising a battery coupled to said regulator input means for providing a backup battery voltage responsive to said first and said second direct current voltages below said battery voltage.

3. A power supply circuit as recited in claim 1 wherein said primary winding of said transformer has a low impedance value whereby a small voltage drop across said primary winding results when the controlled semiconductor switch is activated.

4. A power supply circuit as recited in claim 3 wherein said secondary winding provides a step-up voltage potential whereby to enable said regulator output means for providing said predetermined supply voltage.

5. A power supply circuit as recited in claim 1 wherein said transformer has a step-up ratio of approximately 16:1 between said secondary winding and said primary winding.

6. A power supply circuit as recited in claim 1 wherein said regulator means is an integrated circuit device.

* * * * *